Feb. 16, 1960 C. M. MINKE 2,924,964
INTEGRATOR FOR RECORDING BALLISTICS
Filed Oct. 26, 1955
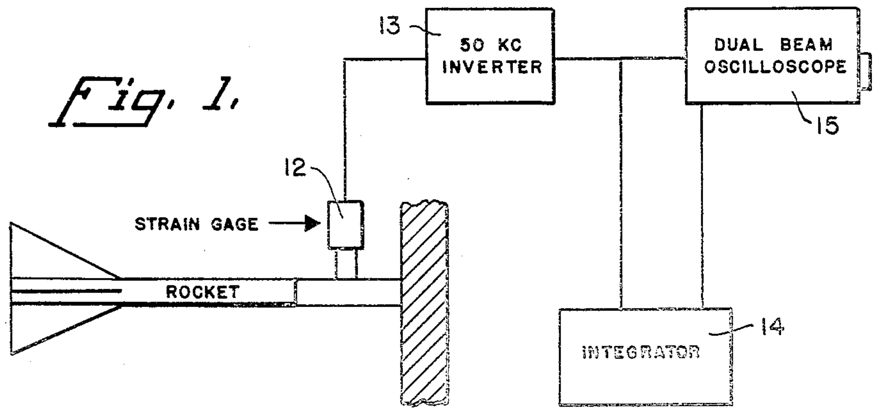
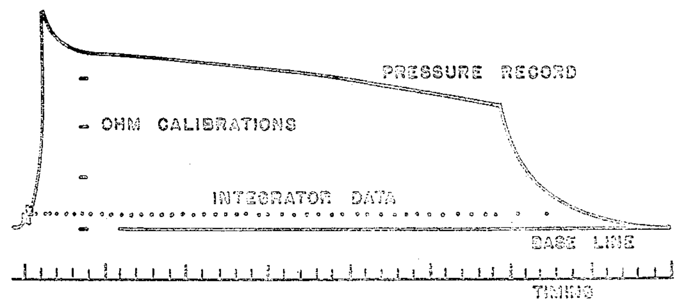
Fig. 2.
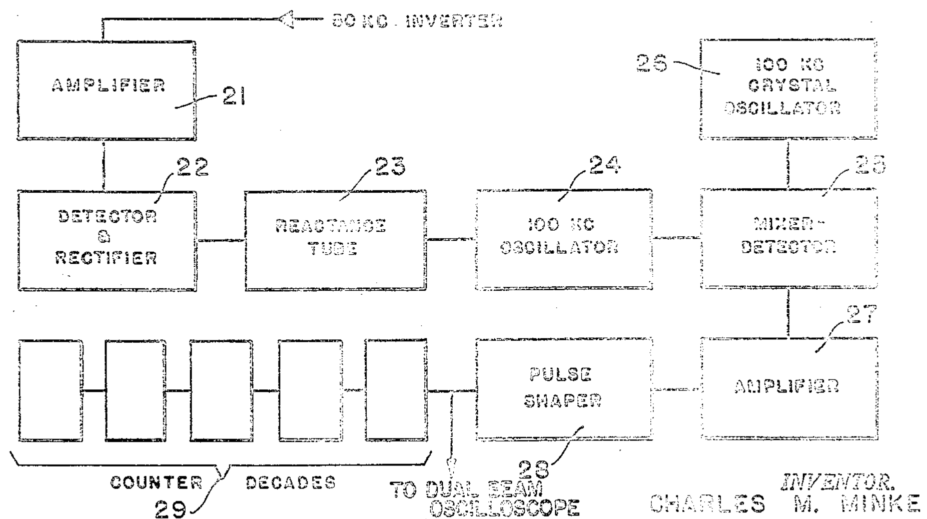
Fig. 3.
INVENTOR.
CHARLES M. MINKE
BY [signatures]
ATTORNEYS United States Patent Office 2,924,964

Patented Feb. 16, 1960

2,924,964

INTEGRATOR FOR RECORDING BALLISTICS

Charles M. Minke, Cumberland, Md., assignor, by mesne assignments, to the United States of America as represented by the Secretary of the Navy Application October 26, 1955, Serial No. 543,041

2 Claims. (Cl. 73—35)

This invention relates to a ballistic integrator and particularly to an automatic electronic integrator using decimal counting units.

The general purpose of this integrator is to determine the integral of thrust or pressure with respect to time. The previous method of determining this factor has been by planimetering the area under a pressure vs. time or thrust vs. time curve obtained by photographic means and converting this area to lb.-seconds or p.s.i.-seconds by using appropriate gage, time and pressure factors. This method was laborious and time consuming. The present invention is a proportional counting system paralleled with an oscilloscope using the same output from a common inverter with the output of the integrator used to intensity modulate the second beam of a dual beam oscilloscope. The results obtained with this integrator are exceptionally better than those determined by planimetering pressure-time curves.

An object of the invention, therefore, is to provide an improved automatic integrator suited for recording ballistics.

Another object of the invention is to provide an integrator which produces the integral of a record with speed and high accuracy.

A further object of the invention is to provide an electronic integrator which will give within one percent accuracy the integral of a rocket performance record.

Other objects and many of the attendant advantages of this invention will be readily appreciated as the same become better understood by reference to the following detailed description when considered in connection with the accompanying drawings wherein:

Fig. 1 is a schematic diagram of a recording system using the ballistic integrator;

Fig. 2 is a curve showing pressure as a function of burning time;

Fig. 3 is a block diagram of the integrator.

In computing ballistic records, it is desirable to know not only the total area under the curves of pressure and thrust as a function of time, but also to know the area under any specific portion of such curves. Intervals to be integrated, for example, may be roughly 0.1 to 90.0 seconds, with an accuracy within one percent.

The integrator 14 described herein is a proportional counting system paralleled with an oscilloscope 15 using the same output from a common inverter 13, for example, a 50 kc. inverter, see Fig. 1. The output of the integrator 14 is used to intensity modulate the second beam of the dual beam oscilloscope 15. A record of chamber pressure as a function of burning time is illustrated in Fig. 2, showing the beam modulation caused by the integrator 14 on the second beam of a dual beam oscilloscope 15, Fig. 1. The intensity modulations appear as a dotted line on the record, Fig. 2, and are placed so that they do not interfere with the record being integrated. The space between these dots varies inversely with the magnitude of the pressure. The ohm calibrations shown are for calculating the pressure; integrator calibrations are made manually periodically. Imaginary lines perpendicular to the base line through each dot enclose the same area in ohm-seconds. The total integral is also indicated on direct reading counter decades 29, Fig. 3.

The ballistics integrator Fig. 3, is an electronic device which converts voltage to some relative counting rate. This is accomplished by means of a reactance tube oscillator which is heterodyned against a stable crystal controlled oscillator. At balance, the reactance tube 23 is adjusted to the frequency of a crystal controlled oscillator 26 or "zero beat." A voltage input will then cause the reactance tube oscillator to change frequency resulting in a proportional counting rate which is recorded by decimal counting units 29. The pickup device has generally been a single arm resistance strain gage 12, Fig. 1, in a bridge circuit calibrated in terms of pounds per ohm change. Unbalance of the strain gage 12 results in a voltage output from the bridge circuit which is amplified and applied to the input of the reactance tube oscillator. The total count recorded by the integrator is thus in terms of ohm-seconds which can immediately be converted to pound-seconds with the appropriate strain gage factor.

The output of the inverter 13 (50 kc. for example) is proportional to the output of the strain gage 12 used. In the block diagram of the integrator 14 as shown in Fig. 3, the signal is passed through amplifier 21 and detector-rectifier 22 of the integrator where it is rectified to produce a D.C. bias signal on the grid of a reactance tube 23 which is connected to oscillator 24 (100 kc. for example). The resulting frequency of the self-controlled 100 kc. oscillator 24 is heterodyned with crystal oscillator 26 (100 kc. for example). The resulting beat frequency is detected by mixer-detector 25, passed through amplifier 27, and shaped by pulse shaper 28 to drive decimal counting units 29. Since the frequency shift of the self-controlled oscillator 24 is proportional to the input of the reactance tube 23, the resulting counting rate of the counters 29 is also proportional to input, neglecting inherent non-linearity of vacuum tubes. The over-all linearity of the system is controlled by changing the operating point of the reactance tube in an effort to correct for the non-linearity in all preceding stages. A balance control is used for controlling linearity and maintaining a zero count condition for zero signal change.

Linearity is checked by applying various known signals for a specific time. For example, resistance changes of 0.5, 1.0, 1.5, and 2.0 ohms is introduced in the bridge circuit of the inverter 13, Fig. 1. A standard time of ten seconds in used in range service. It is possible to adjust and maintain linearity for a long period of time to indicate that the integrator is well suited for general service without critical adjustment being necessary.

Calibration may be achieved by applying a known signal for a definite period. To fully utilize the instrument, the calibration signal should be made close to the average of the signal to be measured, i.e., if the expected average pressure is 1000 p.s.i. using a 1000 p.s.i./ohm strain gage, a one ohm calibration is suggested. For general service 1.5 ohms for 10 seconds to give a 15 ohm-second calibration is recommended.

In operation a brief warm-up period should be provided. For the inverter the normal operating procedure consists in balancing the inverter, the strain gage bridge, and setting the calibration switch to zero.

The step by step integrator operation, for example, may be as follows: (1) Balance the integrator. (2) Switch in 2 ohms with inverter calibration switch. Start timer allowing the count to be recorded for 10 seconds. Note the count and adjust the "gain" accordingly for approximately a 30,000 count. The integrator should be rebalanced each time the "gain" is changed. (3) After the "gain" setting is determined, take readings for 2.0, 1.5, 1.0, and 0.5 ohms. Using the 1.5 ohm reading for the factor, determine if linearity specifications are met.

In formation needed to compute the record is the calibration and "unknown" readings plus the strain gage factor and integrator data on the record (Fig. 1).

*Example*

Calibration=15 ohm-seconds=22,000 count
Unknown=$X$=1,563 count
Gage factor=700 p.s.i./ohm

*Solution*

$$\frac{X}{15}=\frac{1563}{22,000}$$

$$X=\frac{1563\times 15}{22,000}=1.066 \text{ ohm-seconds}$$

$$1.066\times 700=746.2 \text{ p.s.i.-seconds}$$

(Planimeter results in square inches have to be multiplied by the p.s.i./inch and second/inch factors, for each record, to convert the integral to p.s.i.-second units.)

The total integral would be 746.2 p.s.i.-seconds, and in order to determine the integral over the turning time only, one would count the number of dots on the record (Fig. 2) between the end of burning and the end of the pressure curve, multiply by the count value of each dot, convert to p.s.i.-second, and subtract from the total integral of 746.2 p.s.i.-seconds. A count value is picked so that there will be sufficient space between dots for easy reading. Any definite integral can be determined by counting dots on the record.

At least four factors affect the accuracy possible by planimetering records: (1) inconsistency of operator using the planimeter, (2) non-linearity of recording equipment, (3) determining time factors, and (4) determining the pressure or thrust factors. Each of these can introduce an error of possibly 1 percent. Using care in minimizing these errors, the integrator has been verified consistently to within 1 percent. This integrator is more reliable than the present method of planimetering records. A minimum time interval over which accuracy within one percent can be achieved is .033 second. This is based on the following facts:

2 ohms×10 seconds=20 ohm-seconds=30,000 count

This means that the maximum counting rate is 3000 per second over the linear range. If this counting rate is maintained for .033 second, the count is 100. For any shorter interval, one count would be larger than 1 percent of the total count. The maximum integrating time is limited only by the stability of the system and the counting capacity of the counter decades 29. With five decades as shown (Fig. 3) and an average counting race of 2000 counts per second, the maximum time interval is 50 seconds. This can easily be increased by adding additional counter decades, or only three counter decades and a mechanical counter to three or four places might be used.

Although the input to the integrator is shown to be designed for use with a 50 kc. carrier system, any carrier frequency could be adapted. Further, the reactance tube 23 could also be driven by a D.C. amplifier through a cathode follower stage.

Obviously, many modifications and variations of the present invention are possible in the light of the above teachings. It is therefore to be understood that within the scope of the appended claims the invention may be practiced otherwise than as specifically described.

What is claimed is:

1. An electronic integrator comprising a strain gauge, the magnitude of whose output voltage is a function of the force applied to said gauge, a first oscillator of constant frequency, means responsive to the output voltage of the strain gauge for amplitude modulating the output of said first oscillator so that the amplitude of its output is a function of the output voltage of the strain gauge, means for rectifying the output voltage of said first oscillator to produce a D.C. signal; a reactance tube and a second oscillator, said reactance tube controlling the frequency of the output of said second oscillator responsive to the D.C. signal from said rectifier; a third oscillator, the frequency of the output of said third oscillator equaling the frequency of the output of the second oscillator when no force is applied to said strain gauge; a mixer-detector to which the output signals of said second and third oscillators are applied and which produces an output signal whose frequencies is equal to the difference between the frequencies of the output signals of said second and third oscillators; means for forming the output signal of said mixer detector into pulses, and direct reading counter decades for counting said pulses.

2. An automatic ballistic recording device including a dual beam oscilloscope, a strain gauge, an inverter, an electronic integrator and counter decades, said inverter comprising a constant frequency oscillator and a bridge circuit one leg of which includes said strain gauge wherein change of resistance of said strain gauge causes change in amplitude modulation of the output of said inverter, said output of said inverter being applied in parallel to one beam of said dual beam oscilloscope and to said electronic integrator, said electronic integrator comprising a rectifier, a reactance tube, first and second oscillators, a mixer-detector and a pulse shaper, said inverter output applied to said electronic integrator being connected in series with said rectifier, said reactance tube and said first oscillator, said reactance tube controlling the frequency of the output of said first oscillator, the frequency of the output of said second oscillator equaling the frequency of the output of said first oscillator when no force is applied to said strain gauge, the output signals of said first and second oscillators are applied to said mixer-detector which produces an output signal whose frequency is equal to the difference between the frequencies of the output signals of said first and second oscillators, the output signal of said mixer-detector being applied to said pulse shaper, the output of said pulse shaper being applied in parallel to said counter decades and to the second beam of said dual beam oscilloscope.

References Cited in the file of this patent

UNITED STATES PATENTS

| | | |
|---|---|---|
| 2,436,627 | Blitz | Feb. 24, 1948 |
| 2,459,461 | Shankweiler et al. | Jan. 18, 1949 |
| 2,681,563 | Golden | June 22, 1954 |